Patented May 9, 1950

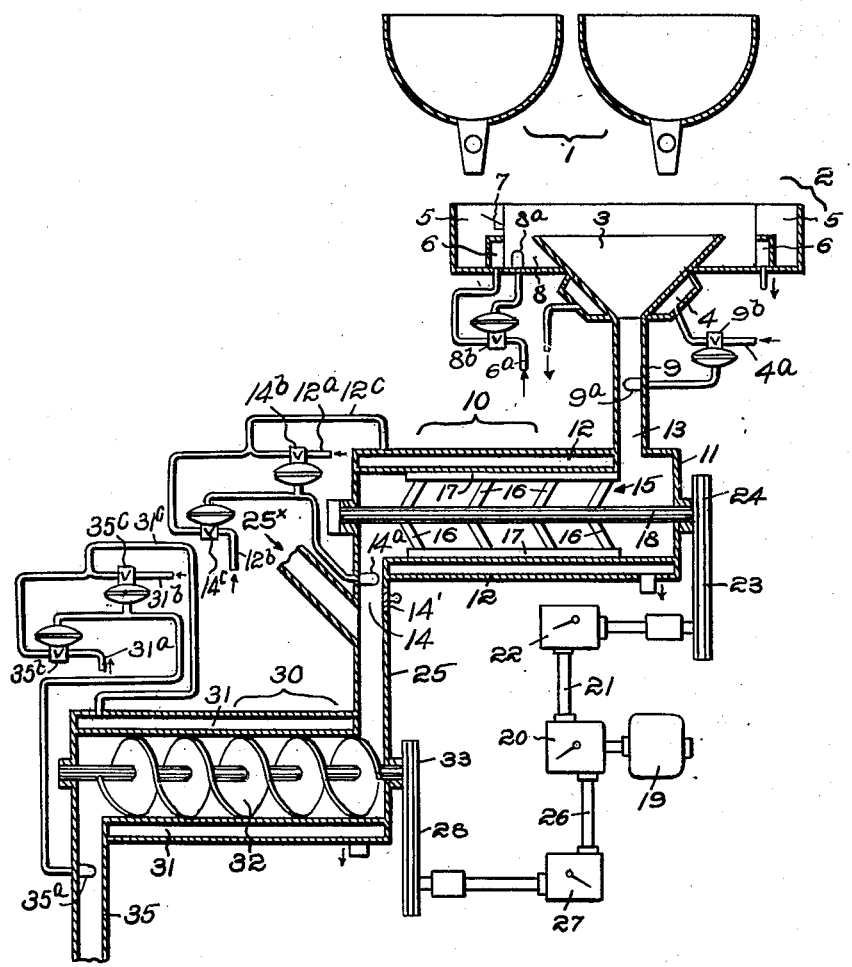

2,507,477

UNITED STATES PATENT OFFICE 2,507,477

PROCESS AND SYSTEM FOR CONFECTIONERY CREAM MANUFACTURE

Stuart P. MacDonald, Arlington, Mass., and John I. Thompson, Washington, D. C., assignors to New England Confectionery Company, Cambridge, Mass., a corporation of Massachusetts Application May 17, 1945, Serial No. 594,186

20 Claims. (Cl. 107—54)

The present invention relates to the processing of fluid and semi-fluid materials, with particular reference to the confectionery and candy making art. In more particular, it aims to provide new and improved processes, systems and apparatus for producing confections, candy and other edible products involving in some part the crystallizing or recrystallizing of sugar, including confectionery cream, fondant, icing, frosting, fudges and analogous preparations, whether as separate article-forming materials or as filling, coating, decorative or other auxiliary materials, any and all of which will be understood as comprehended in the term "confectionery cream" or "cream product" as herein used. In this connection the invention involves correlation and selective control of certain factors including the rate of heat transfer and the timing and manner of introduction and treatment of materials, whereby any desired type of crystallization may be effected at will, and the preparation and processing may be carried out in a unified continuous manufacturing operation through which the materials have synchronized progress to the desired cream product.

While heretofore some efforts have been made toward eliminating interruption and idle periods at one or another stage in the preparation of confectionery cream, the accepted practice has remained that of intermittent or batch mixing, in which separate lots of the cream are prepared, stored and reconditioned for molding as "centers" or other use as required. Such lots generally are non-uniform as to characteristic properties.

In accordance with the present invention one or more of the successive and generally discontinuous steps of the batch method are eliminated or are in effect consolidated and performed simultaneously, with selective and variable control of the crystallization, as to type, fineness, texture, color and other characteristics. Largely by reason of the controllability afforded as to the type of crystallization, the several phases of the processing may be integrated, providing a predetermined continuous progression and delivery of a given quantity of the work material per unit of time. In addition to the selectivity of and improved uniformity in the desired properties of the cream product, the manufacture in general is facilitated and various economies are effected.

In the accompanying drawing we have illustrated, by way of example, partly diagrammatically and schematically, an improved system and apparatus of the invention, adapted for practicing the improved methods thereof.

Referring to the drawing in more particular, the syrup ingredients are supplied and mixed in the desired proportions at a supply station 1 comprising one or more jacketed kettles or other supply containers. As appropriate for confectionery cream this syrup may be the usual or preferred mixture of corn syrup and sugar syrup, or sugar and corn syrup together with the amount of water required to dissolve the sugar, with lesser amounts of other ingredients as desired, presenting a substantially saturated solution as the initial non-concentrated syrup supply. This supply, as indicated, may be preheated or partly concentrated at the initial or syrup mixing station 1, preparatory to bringing it to the desired concentration at the following stage.

The dilute or partly concentrated syrup is continuously advanced by controlled gravity flow, metered flow or otherwise to an automatic cooking, evaporating or concentrating means designated generally at 2. Such means herein comprises a heated surface 3 over which the syrup is distributed as a continuous film or sheet. The heating surface may be that of a plate, trough, tube or conduit, or of a vessel, conical or otherwise, such as shown, heat being supplied as by steam jacketing indicated at 4. The area of this cooking surface is such, and the quantity and rate of flow of the syrup to and along it is so regulated, together with appropriate controls of the plate or vessel temperature, that the sheet or film of continuously flowing syrup is rapidly brought to the proper cooking temperature at which the desired major portion of the liquid content has been driven off by evaporation and the selected concentration of the syrup obtained.

In the diagrammatic illustration, the uncooked but generally somewhat heated syrup mixture from any of the replenishable kettles or vessels at station 1 is received in accumulating and heat-conditioning means at the cooking station 2, shown as a vat or trough-like enclosure 5 provided with controllable pre-heating or heat-maintaining means such as the warm water circulating passage 6. In some instances the syrup ingredients may be initially supplied at the vat 5 and there preheated. From the enclosure 5 the accumulated syrup at the determined temperature is admitted by a valve, gate or other flow regulating means 7 to a control compartment as at 8, along or surrounding the entrance portion of the cooking surface 3. In this compartment or cooking-surface entrance 8 the syrup may be subject to heat from the passage 6 or jacket 4 or both, to maintain its temperature or further preheat it for cooking. The rate of supply of the syrup to the compartment 8 is so controlled as by the gate 7 that the syrup level is maintained at or just above the receiving margin of the cooking surface 3, whereby an uninterrupted sheet-like flow of the preheated syrup to and along the latter is maintained.

At the several locations in the system and apparatus at which conditioning of the material as to temperature is effected suitable controls are installed for the purpose, preferably of an automatic type. Thus at the preheating and cooking stage 2 the compartment 8 for the preheated syrup has installed in heat-subject relation to the material a thermostat 8a. This is conventionally shown as of the expansive fluid type, the thermostat bulb 8a being connected by a fluid pressure conduit with the diaphragm chamber of a thermostatic regulating valve 8b installed in the supply line 6a for the heating medium to the circulating passage 6. Such medium may be steam or warm water, according to the degree of pre-heating desired. In this connection it will be understood that in any instance where the heating medium is steam the control may be had by pressure regulation, providing a corresponding temperature in the passage or jacket 6 under the control of the thermostatic element such as 8a.

In this manner the sheet or film of pre-heated syrup passes onto the cooking surface 3 at a predetermined temperature in accordance with the selective setting for the thermostat. Similarly in association with the cooking surface 3 and the heating jacket 4 therefor automatic or other temperature control is provided for the heating agent, generally steam at this location. Accordingly we have shown an expansive-fluid bulb or other thermostat 9a disposed in the path of flow of the hot concentrated syrup in the conduit 9 leading from the cooking surface. The thermostat 9a communicates with the diaphragm chamber of a thermostatic valve 9b in the supply line 4a for the steam or other heating medium.

By thus presenting and causing the appropriately preheated syrup to traverse the cooker as a sheet or film of regulated volume and rate of flow it is quickly and continuously brought to the selected concentration for delivery to the next treating stage. This is readily determined in relation to temperature; for example, a preferred solid content for the syrup of about 85% to 95% corresponds to a temperature range of about 235° to 245° F. The now concentrated syrup from the heating and cooking station 2, say at an average temperature of 240° F., is directly delivered, preferably through a relatively short conduit 9, to a controllable crystallizing stage indicated as a whole at 10. Here beating and creaming of the hot syrup concentrate is immediately begun and carried on conjointly with cooling.

As indicated, the cooked fondant or syrup at the correct temperature and concentration is in accordance with the invention supplied directly to the creaming stage. As regards this important aspect of the invention the hot syrup concentrate may be cooked in any preferred or convenient manner enabling it to be passed immediately to the creaming or crystallizing stage 10. There the action is such that so long as a continuous supply of the cooked syrup is furnished there is delivered from the creaming enclosure 11 of said stage 10 a continuous flow of the resultant crystallized creamed mass. The concentrating heating or cooking stage 2 as disclosed, providing for controlled flow over a heated surface and thence directly to the creaming enclosure, is particularly adapted to the continuous production of confectionery cream over operating periods of any desired duration.

For this purpose the system here comprises a cylinder or chamber 11 for immuring the cooked hot syrup concentrate, this enclosure 11 having an extensive cooling jacket as at 12 for a fluid coolant such as water circulated at a determined and controlled temperature. Regulation, preferably automatic, for the circulating medium is again here provided. For this purpose there is associated with the chamber 11, as at or adjacent the outlet 14 or in the delivery conduit 25 leading from the chamber, a thermostat 14a which may be similar to those previously referred to. This thermostat is operatively connected in series with the diaphragm chambers of thermostatic valves 14b and 14c installed in the supply lines 12a and 12b respectively for the circulating media at different temperatures, one relatively cold and the other at a higher temperature. For example, the fluid supplied at the line 12b may be ice water and that in the supply conduit 12a may be warm water. The pair of thermostatic regulating valves 14b and 14c will be understood as acting oppositely, in a balancing relation, one of them closing and the other opening in response to a given temperature variation detected at the thermostat 14a in such manner that the common flow to the jacket 12 via the intake conduit 12c will afford the desired temperature for the chamber 11.

Rotary means designated generally at 15 operates in the chamber 11 with a centrifugal action on the material, moving it out into intimate cooling contact with the chamber wall while advancing it through the chamber from the inlet 13 near one end to the outlet 14 adjacent the other end. Such means 15 is represented as comprising a plurality of longitudinally extensive blades or paddles 16 having applicator or film-forming and advancing elements 17 movable in proximity to or contact with the inner wall of the chamber. The blades 16 are mounted on a rotary shaft 18 driven in any convenient manner providing for selective speed control.

By way of example we have represented a motor 19 having its rotor coupled to a master variable speed transmission 20 having an output shaft 21 driving into an individual speed controller 22 the output side of which is drivingly connected through link belt or other means 23 to the driving element 24 of the beater shaft 18. The master controller as shown also has an output shaft 26 which through a separate speed controller 27 and transmission 28 supplies power to the driver 33 at the reheating stage 30 to be described. Any other preferred power and drive means may be employed subject to the desired control so as to provide for synchronized operation at the stages concerned, preferably with capacity for speed regulation commonly for the different stages and also relatively or individually as to each of them.

As stated, the concentrated hot syrup so long as and however supplied, for example as a stream flowing from the receiving surface 3, passes in a continuous supply directly to the crystallizing phase and apparatus at station 10. There the hot cooked syrup directly received at the inlet 9, 13 is instantly immured in the cylindrical chamber 11 and the cream-forming treatment is immediately entered into. Here the received material is rotatively distributed and beaten out against the wall of the chamber 11 and simultaneously subjected to a controlled cooling action. In the course of this treatment continuously succeeding quantities of the material are in effect spread into a relatively thin sheet or film at the peripheral surface of the chamber.

In the continued progress of the immured creaming material through the chamber this film-like formation is alternately applied to and removed or caused to fall from the chamber wall, again to be filmed out and reapplied to the wall, at different areas along it, progressively, this action accordingly to be referred to as rotofilming. A rapid transfer of heat to the chamber wall and to the circulating coolant in the surrounding jacket 12 is thus promoted. It is subject to selective control, by appropriately adjusting the speed of the rotary means 15 and through regulation of the temperature and rate of circulation of the coolant. These factors in accordance with the invention are automatically or otherwise controlled to afford the predetermined rate and duration of simultaneous beating and cooling as found appropriate for the given size of chamber, the particular mixture and the type of crystallization desired. The apparatus at the rotofilming stage 10, including the chamber 11, the rotary means 15 and associated elements will be termed the rotofilm crystallizer, the process as a whole being designated as the rotofilm process for crystallization. Through the described simultaneous action of the rotary means and the attendant filming and cooling the work material is here transformed to a uniform crystalline mass or cream of the selected fineness, texture and viscosity.

From the chamber 11 this material, now in the cream form, is discharged in a continuous stream at the outlet 14, at a substantially lowered temperature from that of the hot syrup concentrate entering this stage 10. The outflow temperature, in any given instance, is a function of the type of crystallization selected, and varies with the other factors above mentioned, such as the size of the chamber, the rate of entry of the material, the speed of the rotary means 15 and the temperature and circulation rate for the coolant. In different instances it may range between room temperature or thereabouts and intermediate temperatures of 120° to 150° F. or more according to the several factors involved and the particular cream formation sought.

In addition to the controllability thus afforded for the type of crystallization the cream resulting at this stage 10 is of improved uniformity and in other respects including that of color equal or superior to cream as heretofore generally obtained under the batch method of first markedly cooling down the syrup, transferred it to another container, and subsequently beating it. The creamed mass at the outlet 14 from the continuous creaming stage 10 may constitute an intermediate or an end product either as a filling or otherwise depending on the use intended. Accordingly the outlet 14 from the creaming stage is shown equipped with a door or other delivery port 14' at which the creamed discharge from the rotofilming chamber 11 is available in a continuous flow, so long as a continuous supply of cooked syrup is furnished at the hopper-like or other in-feeding surface directly in advance of the creaming chamber.

Further by way of contrast with the prior usual practice for the production of fondant and the confectionery cream, the following observations are pertinent. It has been known in the confection making industry that if a cooked syrup is first cooled and then subsequently beaten, a cream of acceptable crystal fineness can be had; also that in general the lower the temperature to which the hot syrup concentrate is cooled before beating the finer will be the resultant crystal. An attendant difficulty has been that excessive precooling may produce too fine crystallization, such that the cream will set in the molds only after standing for a period of hours or even days, or in some instances not at all. Yet it has heretofore been the general belief of skilled confectioners that without substantial preliminary cooling of the concentrated hot syrup only large granular crystals of a coarse or sand-like character can be formed, of an unsatisfactory non-white color, or else there will result a mass which tends to set up hard almost immediately.

From the foregoing description it will be seen that the present invention discards and goes contra to the accepted theory and practice of the confectionery art and in doing so obtains at will any desired type of crystallization for the fondant or cream. Under our process and system the operation of precooling the hot concentrated syrup as heretofore practiced is eliminated. Instead the syrup is passed uninterruptedly to the creaming stage, at which it is simultaneously beaten and cooled. The unexpected result is a cream having a uniform crystalline formation, of whatever degree of fineness is desired for the particular product, bearing in mind as above explained that for some purposes too fine a crystalline structure is undesirable. Control of the type of crystallization is had through the described automatic or other regulation of the various factors involved in the course of the simultaneous working and cooling treatment at the rotofilming stage. These include, as previously stated, control of the rate of introduction of the material to the chamber 11, utilizing a chamber of determined proportions as to diameter and length, regulating the speed of the rotary means, adjusting the temperature of the coolant in the jacket 12, as well as variably predetermining the temperature and degree of concentration of the hot syrup introduced. In any instance substances may be added to the syrup at the crystallizing chamber for either promoting or retarding the crystallization.

From the rotofilming crystallizer stage 10 the resultant cream at the reduced temperature is passed, preferably directly, to a reheating or conditioning stage 30. Here it is brought to the desired temperature and condition for distribution to or direct depositing in starch or other molds, or for other handling in making the particular confection. Passage of the cream from the stage 10 to the reheating chamber 30 may be via a closed or other conduit or conveyer 25 in the course of which there may be introduced as at 25x a metered supply of icing material, flavoring, diluting or other material as may be desired. If preferred, such additional material may be introduced in association with the crystallizing treatment at stage 10, as by metering it directly into the chamber 11 at a selected point along it either before or after the main mass of material therein has attained a definite crystalline or cream condition.

For reheating purposes the conditioning chamber 30 is supplied with suitable heating means, such as relatively warm water circulated in an enclosing jacket 31. This chamber is equipped with a mixing and conveying means such as the screw conveyor 32 having a driving element 33 previously mentioned and arranged for controlled synchronization with the mechanism of stage 10, as already described. The received cream is thereby advanced through and heated in the chamber 30 so as to bring it to proper molding condition. Any icing or other material which has been added after leaving the crystallizing chamber 11 is thus adequately mixed into the fluid cream mass, with a minimum of beating or other agitation or turbulence. That is, the means at the stage 30 provides for heating, mixing and conveying the cream, as contrasted with any such agitation as is generally understood in the industry under the term "beating." From the reheating chamber 30 the cream in condition for casting is delivered at the outlet 35 directly and continuously into a depositor, or is otherwise distributed for finishing into final candy, confectionery or other edible product form. If for any reason it is not desired further to condition the cream immediately for molding or other manufacturing use any or all of it may be collected from the outlet 14 of chamber 10 as at the closeable opening 14'.

It will be understood that the temperature conditioning effected at chamber 30, generally above referred to as reheating, may involve either an increase or decrease of the temperature of the material, depending on the particular product and intended use. That is, in some instances the crystallized material as received from the stage 10 and as mixed and conveyed in chamber 30, may require more or less cooling rather than heating. At such times the appropriate circulating medium is supplied to the jacket 31, such for example as relatively cool water. Here again temperature regulating means is provided, preferably automatic. To afford a substantial range of available temperature conditioning as may be appropriate for the particular end product the jacket 31 of the conditioning chamber 30 is arranged to be supplied with circulating fluids of different temperature, as for example through a steam supply line 31a and a separate supply line 31b for a cooler medium such as water of appropriately relatively lower temperature, either of which or mixtures thereof are furnished to the jacket 31 as by the inlet conduit 31c. Similarly as explained in connection with the crystallizing stage 10 a thermostatic element 35a is associated with the conditioning chamber 30, represented as in the outlet 35 and having operative connection, in series, with the diaphragm chambers of the respective operatively opposed and balanced thermostatic regulating valves 35b and 35c in the fluid supply lines 31a and 31b respectively. Suitable provision may be made in association with the conditioning stage 30 for the release of any excessive amount of entrained air from the material, as by maintaining a small degree of negative pressure in the chamber 30, for exhausting such excess air. In most instances by reason of the generally moderate action of the mixing and conveying means 32 no objectionable locking in of air is experienced and any such air may be otherwise removed, as at some point beyond the delivery from the conditioning chamber 30 and ahead of the molding or other final product-forming stage, as by spreading or thinning the flow of the material.

In the described process the advancing material, whether as hot syrup concentrate, or as cooled crystalline cream, or as the final cream conditioned for molding, may be kept enclosed in a general manner as illustrated, or it may be otherwise brought from one to the following stage, again noting that the creamed product flowing from the creaming chamber 11 is available as at 14' for panning or other use as desired. Such enclosure, facilitated by the continuous system and process as disclosed, is usually found desirable, opportunity for contamination from outside sources being minimized and the desired whiteness or other color-condition of the cream being generally maintained, partly by reason of lessened chance for oxidation under open atmospheric exposure.

By way of explanation of the unexpected results obtained at the rotofilming or simultaneous beating and cooling stage it is believed that the quick cooking and particularly the presenting of the hot cooked syrup for instant entrance into the creaming stage, and the immediately following beating coupled with quick cooling keeps the sugar syrup "sharp," thus insuring avoidance of what is known in connection with the batch method as "killing" a batch of the material. Chemically speaking what appears to be accomplished is the avoidance of inversion, or minimizing of the formation of any appreciable quantity of invert sugars such as dextrose and levulose, both of which otherwise tend to be broken off from the initial syrup, which is mainly or wholly sucrose. Such invert sugars, being much more soluble in water than is sucrose, cause dilution of the material, such that it will never or only with extreme difficulty take a proper crystalline form as desired for confectionery cream.

From the foregoing it will be apparent that the system and process of the invention as here disclosed provide for control of the type of crystallization, making it possible to select at will the fineness for the resultant crystalline formation of the fondant or confectionery cream, as well as affording improved uniformity and the other advantages noted. The described non-intermittent procedure, involving a reduced number of successive and continuous steps or stages whether with or without a continuous-evaporation phase as at the surface 3 but in any event presenting the cooked hot syrup concentrate instantly to the creaming stage, expedites and simplifies the confectionery cream or fondant making process as a whole, to which the invention is particularly but not exclusively applicable.

The invention is not limited to the particular steps and means as herein illustrated or described, its scope being pointed out in the following claims.

We claim:
1. That improved process for the preparation of confectionery cream which comprises the steps of preparing and supplying syrup at a given temperature range, continuously flowing a controlled quantity of the syrup while evaporating and cooking the flowing syrup to a predetermined concentration at a relatively higher temperature, continuing the flow of the concentrated syrup at said temperature, then directly enclosing and simultaneously beating and cooling said syrup to a uniform crystalline cream, and advancing the cream in a continuous operation.

2. The improved confectionery cream preparing process of claim 1 including the step of metering a modifying ingredient such as icing, flavoring and the like to the cream.

3. In the manufacture of confectionery cream, the process which includes entering a supply of hot cooked syrup into a receiving enclosure, there immediately subjecting the syrup to pronounced cooling while simultaneously beating and mixing it and advancing it along and within the enclosure and so controlling the cooling action and correlating it with the rate of advance as to form in the enclosure a confectionery cream mass of determined crystalline consistency, and flowing the cream from the enclosure at the resultant relatively low temperature ranging between room and not more than about 150° F.

4. In the manufacture of confectionery cream, the process which includes preparing and furnishing a supply of relatively dilute syrup at less than cooking temperature; evaporating the syrup to a desired concentration by flowing it subject to heat, immuring the hot syrup concentrate and rotatively beating it out under controlled reductive heat transfer such as to form a cream of selected crystallization, and continuously advancing and delivering the cream alternatively as an intermediate and as an end product.

5. In the manufacture of confectionery cream, the method for controlling crystallization in the formation of the cream which includes the steps of immuring a supply quantity of concentrated syrup at cooking temperature and immediately beating and simultaneously markedly cooling and advancing the material under such maintained rate of temperature-reducing heat transfer as to form a flowable mass of confectionery cream of selected and substantially uniform crystalline consistency.

6. In the manufacture of confectionery cream, the process which includes preparing and furnishing a supply of dilute syrup subject to preheating, continuously flowing a sheet of the preheated syrup over a heated surface and controlling the effective temperature thereat so as to cook the syrup to a predetermined concentration, and thereupon directly flowing the hot cooked syrup concentrate to a cream-forming stage.

7. In the manufacture of confectionery cream, the novel step of beating and simultaneously markedly cooling a hot syrup concentrate by a continuous rotative distributing and advancing action thereon within an enclosure thereby to produce at once a flowable mass of confectionery cream of desired crystalline consistency.

8. That step in a process for making confectionery cream which consists in beating a hot syrup concentrate received at cooking temperature while simultaneously markedly cooling and advancing it so as to provide a continuously flowable mass of confectionery cream of preselective crystallization type.

9. A confectionery cream preparing system comprising means for continuously presenting a supply of uncooked syrup, cooking means constructed and arranged to present a heated surface receiving and flowing the syrup as a sheet thereof at a determined flow rate proportioned to the degree of heating thereby to deliver the material as a controlled continuous stream of hot concentrated syrup, and a crystallizing cylinder equipped with rotary filming, cooling and advancing means so correlated as to the rates of cooling and of advance of the material as to continuously receive the hot concentrated syrup and to deliver a flow of predeterminedly crystallized cream.

10. In a confectionery cream preparing system, a creaming cylinder having at opposite end portions an inlet for hot cooked syrup and an outlet and having a surrounding jacket for a fluid coolant, the jacket equipped with means for determining the temperature of the coolant therein, rotary means in the cylinder between the inlet and outlet for directly receiving and distributively acting on hot cooked syrup supplied to the inlet so as to promote the cooling effect thereon and directly convert it to a relatively cool creamy mass, said rotary means acting also to advance the mass to the cylinder outlet at a rate correlated with the cooling and creaming action, and means near the outlet for infeeding modifying material for incorporation in the cream.

11. In apparatus for the manufacture of confectionery cream, means presenting a supply of dilute syrup, a heated cooking surface adapted to receive the dilute syrup supply and to flow a film thereof so as to deliver a flow of hot syrup of desired concentration, means directing the supplied syrup from the presenting means to the cooking surface means for regulating the rate of flow of the supply syrup to the cooking surface, and thermal control means for the cooking surface.

12. In apparatus for the manufacture of confectionery cream, a crystallizing chamber comprising an elongated closed cylinder having at one end portion an inlet for hot syrup concentrate and at the opposite end portion a delivery outlet for flow of confectionery cream, a cooling jacket surrounding the cylinder, and beating and advancing means rotative within the cylinder about an axis longitudinal thereof and comprising a central shaft and a longitudinally extensive series of blade elements on and distributed about the shaft, said means adapted and arranged to receive the hot syrup concentrate and immediately to subject it to a distributive beating and advancing action so continued along the cylinder subject to the jacket-cooled wall thereof as to directly form in the cylinder a mass of crystalline cream for delivery at the cylinder outlet.

13. In apparatus for the manufacture of confectionery cream, means presenting a supply of dilute syrup, a heated cooking surface adapted to flow a film of syrup and to deliver a flow of hot syrup of desired concentration, means for regulating the rate of flow of the supply syrup to the cooking surface, a crystallizing chamber comprising an elongated closed cylinder having at one end portion an inlet for the hot syrup concentrate and at the opposite end portion a delivery outlet for fluid confectionery cream, a cooling jacket surrounding the cylinder, rotary filming and advancing means in the cylinder on a longitudinal axis concentric thereof, a variably controllable drive for the rotary filming means correlating the advancing action thereof to the cooling rate in the crystallizing chamber so as directly to create confectionery cream therein and to deliver a flow thereof for desired treatment or use.

14. In apparatus for the manufacture of confectionery cream, means presenting a supply of dilute syrup, a heated cooking surface adapted to flow a film of syrup and to deliver a flow of hot syrup of desired concentration, means for regulating the rate of flow of the supply syrup to the cooking surface, a crystallizing chamber comprising an elongated closed cylinder having at one end portion an inlet for the hot syrup concentrate and at the opposite end portion a delivery outlet for fluid confectionery cream, a cooling jacket surrounding the cylinder, and rotary filming and advancing means in the cylinder on a longitudinal axis concentric thereof.

15. Apparatus for the manufacture of confectionery cream comprising, in combination a container for a supply of uncooked syrup, thermally controlled film cooking means for continuously receiving a regulated quantity of the syrup and for flowing it as a heat-subject film and delivering it as a hot syrup concentrate of determined solid content, a crystallizing cylinder adjacent the cooking means and receiving the hot syrup concentrate directly from it, rotary filming and advancing means in the cylinder, and controlled cooling means for carrying off heat from the cylinder.

16. A continuous process for the manufacture of confectionery cream which comprises continuously flowing and evaporatively cooking relatively dilute syrup to bring it to selected concentration of solid content at a characteristic elevated temperature, receiving and immuring the continuous flow of heated concentrate, and immediately rotatively agitating the same while simultaneously transferring heat therefrom at a rate calculated to produce crystalline cream, and continuously discharging the resultant cream.

17. A continuous process for the manufacture of confectionery cream which comprises continuously flowing and evaporatively cooking relatively dilute syrup to bring it to selected concentration of solid content at a characteristic elevated temperature, receiving and immuring the continuous flow of heated concentrate, and immediately subjecting it to a combined rotative beating, mixing and advancing action under controlled simultaneous pronounced cooling whereby cream of selected crystalline character is produced, and delivering a flow of such cream.

18. Confectionery cream apparatus comprising presenting means for a supply of hot cooked syrup, a creaming cylinder adjacently below said means and having an inlet for the hot cooked syrup and a discharge outlet spaced lengthwise from the inlet, means to regulate and control the flow of cooked syrup to the cylinder, controllable cooling means for the creaming cylinder, and rotary means in the cylinder for continuously moving the supplied hot syrup content while subjecting it to cooling thereby directly to produce a creamed mass in the cylinder, said rotary means acting also to advance and discharge the resultant creamed mass in a continuous flow.

19. In a system for the continuous production of confectionery cream, a containing enclosure having an inlet and an outlet spaced from each other, the inlet adapted for continuously receiving a supply of hot cooked syrup, means for continuously subjecting the received cooked syrup to predetermined rapid and pronounced cooling in the enclosure, and rotary means extending between the enclosure inlet and outlet for immediately and continuously distributively moving the enclosure content simultaneously with and during cooling thereof whereby directly to form a creamed mass in the enclosure, said rotary means in conjunction with the cooling means adapted to deliver a flow of cream at the outlet so long as the hot cooked syrup is supplied.

20. A continuous process for manufacture of confectionery cream which includes cooking a fondant of syrup and immediately on cooking supplying the hot cooked syrup into an enclosure, there immediately and continuously rotatively agitating and advancing the received material while simultaneously subjecting it to substantial controlled cooling in the enclosure thereby directly to form confectionery cream, and delivering a continuous flow of the cream so long as the cooked syrup is supplied.

STUART P. MacDONALD.
JOHN I. THOMPSON.

REFERENCES CITED

The following references are of record in the file of this patent:

UNITED STATES PATENTS

| Number | Name | Date |
|---|---|---|
| 1,215,024 | Hohberger | Feb. 6, 1917 |
| 1,432,918 | Steely | Oct. 24, 1922 |
| 1,756,662 | Reed | Apr. 29, 1930 |
| 1,758,602 | Head | May 13, 1930 |
| 1,778,537 | Steely | Oct. 14, 1930 |
| 1,796,934 | Laureys | Mar. 17, 1931 |
| 2,197,919 | Bowman | Apr. 23, 1940 |